(12) United States Patent
Parekh

(10) Patent No.: US 10,984,428 B2
(45) Date of Patent: Apr. 20, 2021

(54) CUSTOMER RATING AS PART OF A CARD TRANSACTION

(71) Applicant: Mastercard International Incorporated, Purchase, NY (US)

(72) Inventor: Pravin Parekh, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 147 days.

(21) Appl. No.: 15/944,338

(22) Filed: Apr. 3, 2018

(65) Prior Publication Data
US 2018/0293594 A1    Oct. 11, 2018

(30) Foreign Application Priority Data

Apr. 10, 2017    (SG) .......................... 10201702948Q

(51) Int. Cl.
G06Q 30/02    (2012.01)
G06Q 20/34    (2012.01)
G06Q 30/06    (2012.01)

(52) U.S. Cl.
CPC ............. *G06Q 30/02* (2013.01); *G06Q 20/34* (2013.01); *G06Q 30/06* (2013.01)

(58) Field of Classification Search
CPC ...................................................... G06Q 30/02
See application file for complete search history.

(56) References Cited

U.S. PATENT DOCUMENTS

| 6,925,441 B1* | 8/2005 | Jones, III | G06Q 10/06375 705/7.33 |
| 2004/0006478 A1* | 1/2004 | Alpdemir | G06Q 30/02 704/275 |
| 2007/0016501 A1* | 1/2007 | Chatterji | G06Q 10/063 705/35 |
| 2007/0244732 A1* | 10/2007 | Chatterji | G06Q 30/02 705/7.29 |

(Continued)

FOREIGN PATENT DOCUMENTS

WO    2009050529 A2    4/2009

OTHER PUBLICATIONS

"PCT Notification of Transmittal of the International Search Report and the Written Opinion", International Searching Authority, dated Jun. 6, 2018, International Application No. PCT/US2018/021456, 11 pp.

*Primary Examiner* — Kurtis Gills
(74) *Attorney, Agent, or Firm* — Bucklet, Maschoff & Talwalkar LLC

(57) ABSTRACT

A method for allowing a merchant to rate a customer as part of a card transaction between the customer and the merchant, the method being performed in a merchant device, the method including: a) obtaining a card number for a payment card of the customer for use in the card transaction; b) obtaining a customer rating input by the merchant; c) generating a transaction message including: i) transaction details indicative of the card transaction, the transaction details including the card number; and ii) the customer rating; and d) transferring the transaction message to a (Continued)

server via a payment network, to thereby allow the server to: i) determine a customer identifier based on the card number; and ii) cause the customer rating to be stored in a ratings database in association with the customer identifier.

10 Claims, 10 Drawing Sheets

(56) References Cited

U.S. PATENT DOCUMENTS

| | | | |
|---|---|---|---|
| 2014/0025461 A1* | 1/2014 | Knowles | G06Q 30/0222 705/14.23 |
| 2014/0136373 A1* | 5/2014 | Kinsey, II | G06Q 10/1095 705/26.63 |
| 2014/0344086 A1* | 11/2014 | Pasta | G06Q 20/20 705/21 |
| 2015/0332305 A1* | 11/2015 | Kodali | G06Q 30/0229 705/14.25 |

* cited by examiner

CUSTOMER RATING AS PART OF A CARD TRANSACTION

CROSS-REFERENCE TO RELATED APPLICATION

This application is a U.S. National Stage filing under 35 U.S.C. § 119, based on and claiming benefits of and priority to Singapore Patent Application No. 10201702948Q filed on Apr. 10, 2017. The entire disclosure of the above application is incorporated herein by reference for all purposes.

BACKGROUND OF THE INVENTION

The present invention relates to methods for allowing a merchant to rate a customer as part of a card transaction or access a consolidated customer rating for a customer.

DESCRIPTION OF THE PRIOR ART

Rating systems may be used to allow customers and/or merchants to provide feedback on how the other party performed in a transaction. This feedback may be collected and used to allow to the reputation of customers or merchants to be evaluated by other customers or merchants, such as to provide confidence before undertaking a new transaction.

For example, the eBay online auction and shopping website uses a rating system that allows buyers and sellers to leave feedback about the transaction, which contributes to a feedback score for each member. Another example is the Uber ride sharing application that allows drivers and riders to rate each other based on their ride experience.

However, rating systems of this type tend to only be implemented on a website or application used by merchants to offer their goods or services, and therefore may only be useful for users of that website/application.

Some ratings systems exist for allowing consumers to rate merchants independently of the website or application used by the merchant, but equivalent systems are less common for rating consumers. One reason for this is that the identity of a consumer may not always be available to a merchant, whereas the identity of a merchant will usually be known to a customer.

It would be desirable to provide a consumer rating platform that can enable one or more of consolidating customer ratings across merchants, sharing of customer ratings with other merchants, viewing average consumer ratings across merchants for decision making purposes, or blacklisting consumers based on consumer ratings.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

SUMMARY OF THE PRESENT INVENTION

In a broad form the present invention seeks to provide a method for allowing a merchant to rate a customer as part of a card transaction between the customer and the merchant, the method being performed in a merchant device, the method including:
   a) obtaining a card number for a payment card of the customer for use in the card transaction;
   b) obtaining a customer rating input by the merchant;
   c) generating a transaction message including:
      i) transaction details indicative of the card transaction, the transaction details including the card number; and
      ii) the customer rating; and
   d) transferring the transaction message to a server via a payment network, to thereby allow the server to:
      i) determine a customer identifier based on the card number; and
      ii) cause the customer rating to be stored in a ratings database in association with the customer identifier.

In another broad form the present invention seeks to provide a merchant device for allowing a merchant to rate a customer as part of a card transaction between the customer and the merchant, the merchant device being configured to:
   a) obtain a card number for a payment card of the customer for use in the card transaction;
   b) obtain a customer rating input by the merchant;
   c) generate a transaction message including:
      i) transaction details indicative of the card transaction, the transaction details including the card number; and
      ii) the customer rating; and
   d) transfer the transaction message to a server via a payment network, to thereby allow the server to:
      i) determine a customer identifier based on the card number; and
      ii) cause the customer rating to be stored in a ratings database in association with the customer identifier.

In another broad form the present invention seeks to provide a method for allowing a merchant to rate a customer as part of a card transaction between the customer and the merchant, the method being performed in a server, the method including:
   a) receiving, from a merchant device via a payment network, a transaction message generated by the merchant device, the transaction message including:
      i) transaction details indicative of the card transaction, the transaction details including a card number for a payment card of the customer for use in the card transaction; and
      ii) a customer rating input by the merchant using the merchant device;
   b) determining a customer identifier based on the card number; and
   c) causing the customer rating to be stored in a ratings database in association with the customer identifier.

In another broad form the present invention seeks to provide a server for allowing a merchant to rate a customer as part of a card transaction between the customer and the merchant, the server being configured to:
   a) receive, from a merchant device via a payment network, a transaction message generated by the merchant device, the transaction message including:
      i) transaction details indicative of the card transaction, the transaction details including a card number for a payment card of the customer for use in the card transaction; and
      ii) a customer rating input by the merchant using the merchant device;
   b) determine a customer identifier based on the card number; and
   c) cause the customer rating to be stored in a ratings database in association with the customer identifier.

In another broad form the present invention seeks to provide a method for allowing a merchant to rate a customer as part of a card transaction between the customer and the merchant, the method being performed in a ratings server including a ratings database, the method including:

a) receiving, from an issuer server, a rating message generated by the issuer server in response to receipt of a transaction message transferred from a merchant device via a payment network, the rating message including:

i) a customer identifier determined based on a card number for a payment card of the customer for use in the card transaction; and ii) a customer rating input by the merchant using a merchant device; and b) storing the customer rating in the ratings database in association with the customer identifier.

In another broad form the present invention seeks to provide a ratings server for allowing a merchant to rate a customer as part of a card transaction between the customer and the merchant, the ratings server including a ratings database and being configured to:

a) receive, from an issuer server, a rating message generated by the issuer server in response to receipt of a transaction message transferred from a merchant device via a payment network, the rating message including:

i) a customer identifier determined based on a card number for a payment card of the customer for use in the card transaction; and ii) a customer rating input by the merchant using a merchant device; and b) store the customer rating in the ratings database in association with the customer identifier.

In another broad form the present invention seeks to provide a method for allowing a merchant to access a consolidated customer rating for a customer, the method being performed in a merchant device, the method including:

a) obtaining a card number for a payment card of the customer;

b) obtaining a merchant request for a consolidated customer rating for the customer;

c) generating a rating request message including the card number;

d) transferring the rating request message to a server via a payment network, to thereby allow the server to:

i) determine a customer identifier based on the card number;

ii) cause a consolidated customer rating to be determined based on customer ratings stored in a ratings database in association with the customer identifier;

iii) generate a rating response message including the consolidated customer rating; and iv) transfer the rating response message to the merchant device via the payment network; and e) receiving the rating response message; and, f) displaying the consolidated customer rating.

In another broad form the present invention seeks to provide a merchant device for allowing a merchant to access a consolidated customer rating for a customer, the merchant device being configured to:

a) obtain a card number for a payment card of the customer;

b) obtain a merchant request for a consolidated customer rating for the customer;

c) generate a rating request message including the card number;

d) transfer the rating request message to a server via a payment network, to thereby allow the server to:

i) determine a customer identifier based on the card number; and ii) cause a consolidated customer rating to be determined based on customer ratings stored in a ratings database in association with the customer identifier;

iii) generate a rating response message including the consolidated customer rating;

iv) transfer the rating response message to the merchant device via the payment network; and e) receive the rating response message; and f) display the consolidated customer rating.

In another broad form the present invention seeks to provide a method for allowing a merchant to access a consolidated customer rating for a customer, the method being performed in a server, the method including:

a) receiving, from a merchant device via a payment network, a rating request message generated by the merchant device in response to a merchant request for a consolidated customer rating for the customer, the rating request message including a card number for a payment card of the customer;

b) determining a customer identifier based on the card number;

c) causing a consolidated customer rating to be determined based on customer ratings stored in a ratings database in association with the customer identifier;

d) generate a rating response message including the consolidated customer rating; and e) transferring the rating response message to the merchant device via the payment network, to thereby allow the consolidated customer rating to be displayed using the merchant device.

In another broad form the present invention seeks to provide a server for allowing a merchant to access a consolidated customer rating for a customer, the server being configured to:

a) receive, from a merchant device via a payment network, a rating request message generated by the merchant device in response to a merchant request for a consolidated customer rating for the customer, the rating request message including a card number for a payment card of the customer;

b) determine a customer identifier based on the card number;

c) cause a consolidated customer rating to be determined based on customer ratings stored in a ratings database in association with the customer identifier;

d) generate a rating response message including the consolidated customer rating; and e) transfer the rating response message to the merchant device via the payment network, to thereby allow the consolidated customer rating to be displayed using the merchant device.

In another broad form the present invention seeks to provide a method for allowing a merchant to access a consolidated customer rating for a customer, the method being performed in a ratings server including a ratings database, the method including:

a) receiving, from an issuer server, a rating query message generated by the issuer server in response to receipt of a rating request message transferred from a merchant device via a payment network, the rating query message including a customer identifier determined based on a card number for a payment card of the customer;

b) querying the ratings database to determine customer ratings stored in association with the customer identifier;

c) determining a consolidated customer rating based on the customer ratings; and d) transferring the consolidated customer rating to the issuer server to thereby allow the consolidated customer rating to be returned to the merchant device via the payment network and to allow the consolidated customer rating to be displayed using the merchant device.

In another broad form the present invention seeks to provide a ratings server for allowing a merchant to access a consolidated customer rating for a customer, the ratings server including a ratings database and being configured to:

a) receive, from an issuer server, a rating query message generated by the issuer server in response to receipt of a rating request message transferred from a merchant device via a payment network, the rating query message including a customer identifier determined based on a card number for a payment card of the customer;

b) query the ratings database to determine customer ratings stored in association with the customer identifier;

c) determine a consolidated customer rating based on the customer ratings; and d) transfer the consolidated customer rating to the issuer server to thereby allow the consolidated customer rating to be returned to the merchant device via the payment network and to allow the consolidated customer rating to be displayed using the merchant device.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

An example of the present invention will now be described with reference to the accompanying drawings, in which:—

DETAILED DESCRIPTION OF THE PREFERRED EMBODIMENTS

Figure 1A:
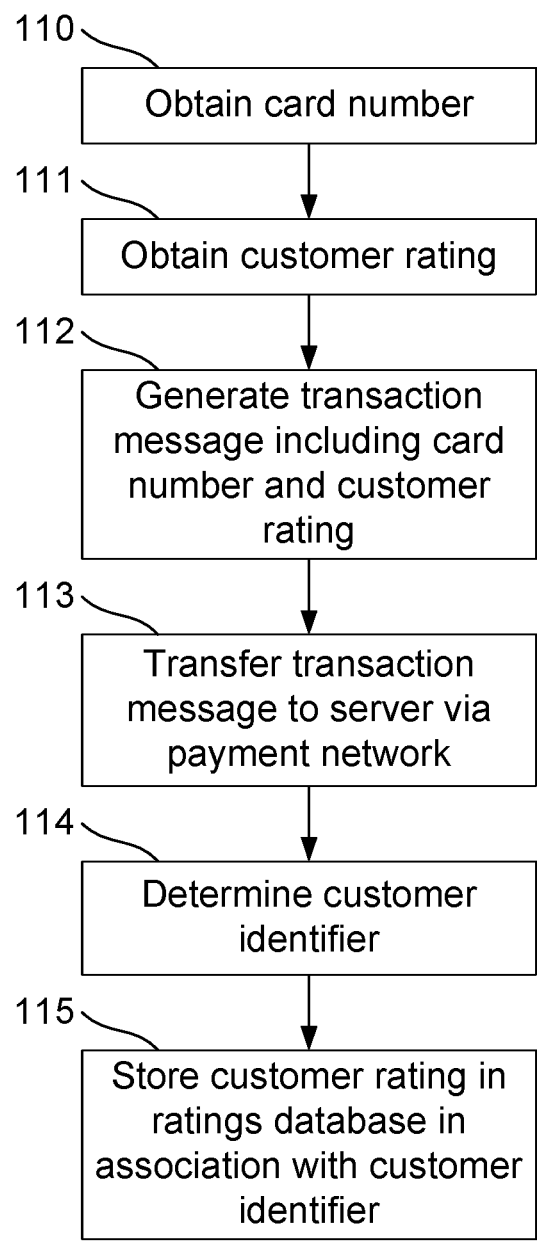
FIG. 1A is a flow chart of an example of a method for allowing a merchant to rate a customer as part of a card transaction between the customer and the merchant.

An example of a method for allowing a merchant to rate a customer as part of a card transaction between the customer and the merchant will now be described with reference to FIG. 1A.

This example will be described in relation to a credit card transaction, although it should be appreciated that the example could alternatively be described using a debit card transaction. Throughout the following, whilst reference is made to card payments in particular, the techniques could be used when payment is performed using other similar mechanisms, such as when using virtual wallets, contactless payment solutions, or the like.

It should be understood that when credit/debit card transactions are performed, for example between a merchant and customer, the payments are processed by an acquirer and an issuer. The acquirer and the issuer are typically entities such as financial institutions, banks or the like. The acquirer processes and settles a merchant's credit card transactions with the help of the issuer, which is the entity that has issued the credit card to the customer to allow the customer to make card payments. The issuer acts to debit an account of the customer, transferring funds to the acquirer, who then allocates these to the merchant. As part of this process, an interchange fee is allocated to the issuer, whilst a merchant services fee is charged to the merchant by the acquirer.

With conventional payment processes, details of the transaction are passed from the merchant to the acquirer, and then from the acquirer to the issuer via a payment network operated by a card payment service provider, as part of batch processes, typically performed on a daily basis. Once the issuer receives transaction details, they debit funds from the user, subtracting the interchange fee and passing the funds on to the acquirer.

The credit/debit card payment process is typically facilitated by transferring the details of the transaction in a standardised transaction message format in which transaction details, such as the payment amount, are provided as specific data elements. This allows required transaction parameters to be readily obtained by the different parties to the transaction as the process is carried out.

For the purpose of illustration of one aspect of the method, it is assumed that the process is performed at least in part using a merchant device, such as a point of sale (POS) terminal operated by the merchant for facilitating card transactions. The merchant device will communicate with an acquirer associated with the merchant, such as a bank with which the merchant has a merchant bank account into which payments to the merchant will be transferred from customer accounts. The acquirer will then communicate with a payment network operated by a service provider that facilitates the processing of card transactions on behalf of a merchant. The payment network will in turn communicate with issuers of customer payment cards to allow transaction messages and the like to be transferred between the different parties as required for allowing card transactions to be performed.

In this example, the method will commence at step 110, with the merchant device obtaining a card number for a payment card of the customer for use in the card transaction. This will usually occur in response to a customer purchase or order for which a card transaction may be required to make a payment from the customer to the merchant. It will be appreciated that the card number may be obtained using any conventional technique, such as by swiping the customer's payment card using a card reader of the merchant device or tapping a customer's payment card on a merchant device having a contactless payment capability.

The following step 111 involves the merchant device obtaining a customer rating input by the merchant. Typically the customer rating will be input by the merchant interacting with an input interface of the merchant device, such as a numerical keypad which may be provided using physical keys or on a touch screen interface of the merchant device.

At step 112, the merchant device will generate a transaction message including transaction details indicative of the card transaction, the transaction details including the card number obtained in step 110, together with the customer rating obtained in step 111. It should be appreciated that the transaction message may be of any appropriate form, but will typically have a standardised format including a number of predetermined data elements in which particular transaction details will be provided to allow the required transaction details to be readily obtained by different recipients of the transaction file. The transaction details may further include a transaction amount, a merchant identifier, a merchant category code, and security details associated with the payment card. It should be appreciated that merchant category code can relate to an industry that the merchant trades under, for example, retail, travel, utilities, dining, and so forth.

The transaction details can be determined in any suitable manner, depending on the preferred implementation. Typically, these are provided using the merchant device as part of the card transaction. However, this is not essential, and the transaction details could be determined in any suitable manner, such as retrieving these from a database, or the like.

Then, at step 113, the transaction message will be transferred from the merchant device to a server via a payment network, to allow further processing by the server. In particular, the server will determine a customer identifier based on the card number as indicated at step 114, and subsequently cause the customer rating to be stored in a ratings database in association with the customer identifier.

Depending on the particular implementation of the method, the above mentioned server may be operated by the issuer associated with the customer's payment card or may alternatively be operated by the service provider providing the payment network. In some examples, the functionalities of the server may be distributed across multiple processing devices which may be operated by different parties. In one specific example, the server may be an issuer server operated by an issuer associated with the payment card of the customer, whilst the ratings database may be provided as part of a ratings server, which may be operated by the service provider.

Otherwise, the transaction message may be processed by the acquirer, the payment network and the issuer in a generally conventional manner to enable the card transaction to be performed. It will be appreciated that the processing of the transaction message for providing the customer rating functionality can be performed in a manner that will not interrupt the normal transaction flow. Further details of the processing tasks at the server end will be described in due course, although it will be appreciated that, from the perspective of the merchant device, these will be performed as back-end tasks.

In any event, it will be appreciated that the above described method allows a customer rating input by a merchant during a card transaction to be stored in a centralised ratings database as an extended functionality of a conventional card transaction.

As will be described in further detail below, this functionality can be used to provide a centralized platform to store and consolidate customer ratings across merchants, service providers and businesses. For example, the stored customer ratings may be used to allow businesses to view average customer ratings across merchants, service providers and businesses. Thus, the method may provide a platform to allow businesses to share customer ratings, which may be used, for instance, to blacklist customers with unacceptably low ratings or to take other pro-active measures based on the customer ratings before proceeding with a card transaction.

A number of further features of the method from the perspective of the merchant device will now be described.

The particular steps for obtaining the customer rating may vary depending on the implementation. In one example, the method may include the merchant device displaying a prompt for the merchant to input the customer rating after obtaining the card number and then obtaining the customer rating in response to the displayed prompt. In an alternative example, the method may include receiving a rating command input by the merchant to indicate that the merchant wishes to rate the customer (for instance, the merchant pressing a particular key such as "#") and obtaining the customer rating after receiving the rating command. In either case, the obtaining the customer rating may include the merchant manually inputting a number indicative of the customer rating using a numerical keypad of the merchant device.

In some implementations, the method may include generating the transaction message so that the customer rating is included in a predetermined data element of the transaction message. As mentioned above, the transaction message may be generated in a standard format including a plurality of standard data elements, such that the method may be facilitated by modifying a standard transaction message so that a predetermined one of the standard data elements for use with the customer rating. Despite the modifications to the standard transaction message to provide the customer rating, the transaction message may otherwise be used by the different parties to the transaction to allow the card transaction to be processed in a conventional manner.

In one example, the method includes initially transferring the transaction message to an acquirer server associated with the merchant device. The acquirer server will then transfer the transaction message to the payment network and the payment network will subsequently transfer the transaction message to an issuer server associated with the payment card of the customer, to thereby allow the issuer server to determine the customer identifier and cause the customer rating to be stored in the ratings database.

As mentioned above, the transaction message can still be processed in a conventional manner, such that the method may include the merchant device causing the card transaction to be authorized by the issuer server based on the transaction details of the transaction message, with the issuer server generating an authorization message and transferring the authorization message to the merchant device via the payment network, so that the merchant device receives the authorisation message.

In view of the above, it will be appreciated that a merchant device for allowing a merchant to rate a customer as part of a card transaction between the customer and the merchant as discussed above may be configured to: obtain a card number for a payment card of the customer for use in the card transaction; obtain a customer rating input by the merchant; generate a transaction message including transaction details indicative of the card transaction and including the card number and the customer rating; and transfer the transaction message to a server via a payment network, to thereby allow the server to determine a customer identifier based on the card number; and cause the customer rating to be stored in a ratings database in association with the customer identifier.

In another aspect, the method illustrated in FIG. 1A may be described from the perspective of the server, such that the method includes the following specific steps performed by the server. The server will receive, from a merchant device via a payment network, a transaction message as per step 113. It will be recalled that the transaction is generated by the merchant device as per step 112, after the card number and customer rating were obtained. The transaction message includes the transaction details indicative of the card transaction, the transaction details including the card number for the payment card of the customer for use in the card transaction. The transaction message also includes the customer rating input by the merchant using the merchant device. In response to receipt of the transaction message, the server will determine the customer identifier based on the card number as per step 114. Following this, the server will cause the customer rating to be stored in the ratings database in association with the customer identifier, as per step 115.

A number of further features of the method of FIG. 1A from the perspective of the server will now be described.

In some examples, the step of determining the customer identifier may include extracting a primary account number (PAN) from the card number. In this regard, it is noted that card numbers typically include a bank identification number (BIN) provided by the leading six digits and a PAN provided by the remaining digits. In some implementations the PAN may be used as the customer identifier, or in other implementations, the PAN may be used to determine the customer identifier in a subsequent step.

In some implementations, determining the customer identifier may include retrieving, from an issuer database, a customer identifier associated with the card number. As discussed above, the server may be an issuer server operated by an issuer associated with the payment card of the customer. The issuer server may include the issuer database for managing its customer records, in which case the customer identifier may be determined by the issuer server querying the issuer database.

As mentioned previously, the customer rating may be provided in a predetermined data element of the transaction message, and accordingly, in some embodiments the server may extract the customer rating from the predetermined data element.

In some practical implementations, the server may cause the customer rating to be stored in the ratings database by generating a rating message including at least the customer identifier and the customer rating and transferring the rating message to a ratings server including the ratings database, to thereby allow the ratings server to store the customer rating in the ratings database in association with the customer identifier.

In some embodiments, the server may generate the rating message so that the rating message includes additional rating details such as a merchant identifier, an issuer identifier and/or a transaction date. Then, the server may cause the ratings server to store at least some of the additional rating details in the ratings database with the customer rating.

In view of the above, it will be appreciated that a server for allowing a merchant to rate a customer as part of a card transaction between the customer and the merchant as discussed above may be configured to: receive, from a merchant device via a payment network, a transaction message generated by the merchant device, the transaction message including: transaction details indicative of the card transaction, the transaction details including a card number for a payment card of the customer for use in the card transaction; and a customer rating input by the merchant using the merchant device; determine a customer identifier based on the card number; and cause the customer rating to be stored in a ratings database in association with the customer identifier.

In another aspect, the method illustrated in FIG. 1A may also be described from the perspective of the ratings server including the ratings database. In this case, the method includes the following specific steps performed by the ratings server, which relate to step 115 of FIG. 1A. The ratings server may receive, from the issuer server, a rating message generated by the issuer server in response to receipt of the transaction message transferred from the merchant device via a payment network. The rating message may include the customer identifier determined based on the card number for the payment card of the customer for use in the card transaction, and the customer rating input by the merchant using a merchant device. The ratings server will be configured to respond to receipt of the rating message by storing the customer rating in the ratings database in association with the customer identifier.

In view of the above, it will be appreciated that a ratings server for allowing a merchant to rate a customer as part of a card transaction between the customer and the merchant as discussed above may include the ratings database and be configured to: receive, from an issuer server, a rating message generated by the issuer server in response to receipt of a transaction message transferred from a merchant device via a payment network, the rating message including: a customer identifier determined based on a card number for a payment card of the customer for use in the card transaction; and a customer rating input by the merchant using a merchant device; and store the customer rating in the ratings database in association with the customer identifier.

In view of the above, it will be appreciated that implementations of the method illustrated in FIG. 1A will enable the centralised storage of customer ratings leverage existing transaction processing infrastructure and techniques using a modified form of the transaction message that would be generated for a card transaction in any event.

The customer ratings stored in the ratings database may be accessed by merchants using any suitable means, such as by using application software provided by the payment network service provider or issuer for execution on an electronic processing device operated by the merchant. However, it may be particularly advantageous technique to allow merchants to access consolidated customer ratings through the merchant device as part of a card transaction, using similar techniques as described above for the actual rating of the customer.

Accordingly, an example of a method for allowing a merchant to access a consolidated customer rating for a customer will now be described with reference to FIG. 1B.

Although the present method may not necessarily be performed as part of a card transaction, this example will be implemented using card transaction infrastructure as per the method discussed above with reference to FIG. 1A. For the purpose of illustration of one aspect of the present method, it is assumed that the process is also performed at least in part using a merchant device, such as a point of sale (POS)

terminal operated by the merchant for facilitating card transactions. The merchant device will communicate with an acquirer associated with the merchant, which will then communicate with a payment network operated by a service provider, which will in turn communicate with an issuer.

It should be appreciated that the communications in this example will not necessarily follow the same flow as a card transaction (as may be the case in the method discussed with reference to FIG. 1A), however it may be desirable to implement the process so that this is the case, in order to more efficiently utilise the card transaction infrastructure for enabling the customer rating functionality.

In this example, the method will commence at step 120, with the merchant device obtaining a card number for a payment card of the customer. Once again, it will be appreciated that the card number may be obtained using any conventional technique, such as by swiping the customer's payment card using a card reader of the merchant device or tapping a customer's payment card on a merchant device having a contactless payment capability.

Typically, the card number will be obtained when the customer is about to perform a card transaction with the merchant, for instance when the customer wishes to purchase goods or services from the merchant. In some examples, the card number may be obtained for allowing a pre-authorization or hold to be performed, such as when a customer is checking into accommodation, hiring a vehicle or the like. It will be appreciated that this will enable the merchant to access a consolidated customer rating for the customer as part of the card transaction which can allow the merchant to decide how to proceed with the card transaction based on the consolidated customer rating. However, this is not essential, and in some cases the card number may be obtained solely for the purpose of enabling the merchant to access a consolidated rating for the customer.

The following step 121 involves the merchant device obtaining a merchant request for a consolidated customer rating for the customer. Typically the merchant request will be input by the merchant interacting with an input interface of the merchant device, such as a numerical keypad which may be provided using physical keys or on a touch screen interface of the merchant device. For instance, the merchant may press a particular key or option for requesting a consolidated customer rating. In some cases, the merchant request may be obtained before the card number is obtained.

At step 122, the merchant device will generate a rating request message including the card number obtained in step 120. The rating request message may be of any appropriate form, although it may be desirable to generate the rating request message in a standardised format similar to transaction messages used in performing card transactions. It will be appreciated that the use of a standardised message format will allow the rating request message to be more readily handled by existing card payment infrastructure, thereby allowing the functionality for accessing a consolidated customer rating to be implemented with a reduced need for modifications to the standard processes of the different parties to the method.

Then, at step 123, the rating request message will be transferred from the merchant device to a server via a payment network, to allow further processing by the server. In particular, the server will determine a customer identifier based on the card number as indicated at step 124, cause a consolidated customer rating to be determined at step 125, based on customer ratings stored in a ratings database in association with the customer identifier, generate a rating response message including the consolidated customer rating at step 126, and transfer the rating response message back to the merchant device via the payment network at step 127.

The server discussed in the above steps will be the same server as described in the previous method with reference to FIG. 1A, which may be operated by the issuer associated with the customer's payment card or may alternatively be operated by the service provider providing the payment network as previously discussed. In one specific example, the server may be an issuer server operated by an issuer associated with the payment card of the customer, whilst the ratings database may be provided as part of a ratings server, which may be operated by the service provider.

Further details of the processing tasks at the server end will be described in due course, although it will be appreciated that, from the perspective of the merchant device, these will be performed as back-end tasks. Once the rating response message transferred at step 127 is received by the merchant device, the merchant device can then display the consolidated customer rating to the merchant as shown at step 128.

It will be appreciated that the above described method allows a merchant to access a consolidated customer rating for the customer, based on customer ratings stored in a centralised ratings database, particularly by leveraging existing card transaction infrastructure. The ability to access such a consolidated customer rating before proceeding with a card transaction can be useful to allow the merchant to make an informed decision on whether to proceed to engage in business with the customer based on their consolidated customer rating, or whether to modify the terms of their engagement or the nature of the card transaction to be performed.

The ability to access a consolidated customer rating can empower the merchant to make decisions based on the consolidated customer rating. For example, merchants could request pre-payment instead of post-payment for goods or services, or in the event that a merchant is performing a card pre-authorization for a customer booking, the merchant may request a consolidated customer rating and use this to determine the amount to be pre-authorized before proceeding.

A number of further features of the present method from the perspective of the merchant device will now be described.

In some embodiments, the step of obtaining the merchant request may include the merchant device receiving a request command input by the merchant to indicate that the merchant wishes to access the consolidated customer rating for the customer. In some examples, the request command could involve the merchant pressing a particular key that does not outwardly indicate to the customer that a consolidated customer rating is being requested.

In implementations based on conventional card transaction infrastructure, the rating request message may be transferred to an acquirer server associated with the merchant device, to allow the acquirer server to transfer the rating request message to the payment network, which can subsequently transfer the rating request message to an issuer server associated with the payment card of the customer, to thereby allow the issuer server to determine the customer identifier, cause the consolidated customer rating to be determined and return the consolidated customer rating to the merchant device.

In some examples, after the consolidated customer rating has been displayed, the merchant device may additionally display a prompt for the merchant to take further action depending on the consolidated customer rating. For example, if the method is performed to allow the merchant to access a consolidated customer rating as part of a card transaction, the prompt may include options for selection by the merchant to enable different actions to be taken in connection with the card transaction. For example, the merchant may be able to select options to process the card transaction, modify the card transaction or cancel the card transaction. It will be appreciated that if the method is performed separately from a card transaction, then the merchant could choose to initiate a card transaction after the method has been completed, and the merchant may decide on the specific parameters of the card transaction based on the consolidated customer rating.

In view of the above, it will be appreciated that a merchant device for allowing a merchant to access a consolidated customer rating for a customer as discussed above may be configured to: obtain a card number for a payment card of the customer; obtain a merchant request for a consolidated customer rating for the customer; generate a rating request message including the card number; transfer the rating request message to a server via a payment network, to thereby allow the server to: determine a customer identifier based on the card number; and cause a consolidated customer rating to be determined based on customer ratings stored in a ratings database in association with the customer identifier; generate a rating response message including the consolidated customer rating; transfer the rating response message to the merchant device via the payment network; and receive the rating response message; and display the consolidated customer rating.

Figure 1B:
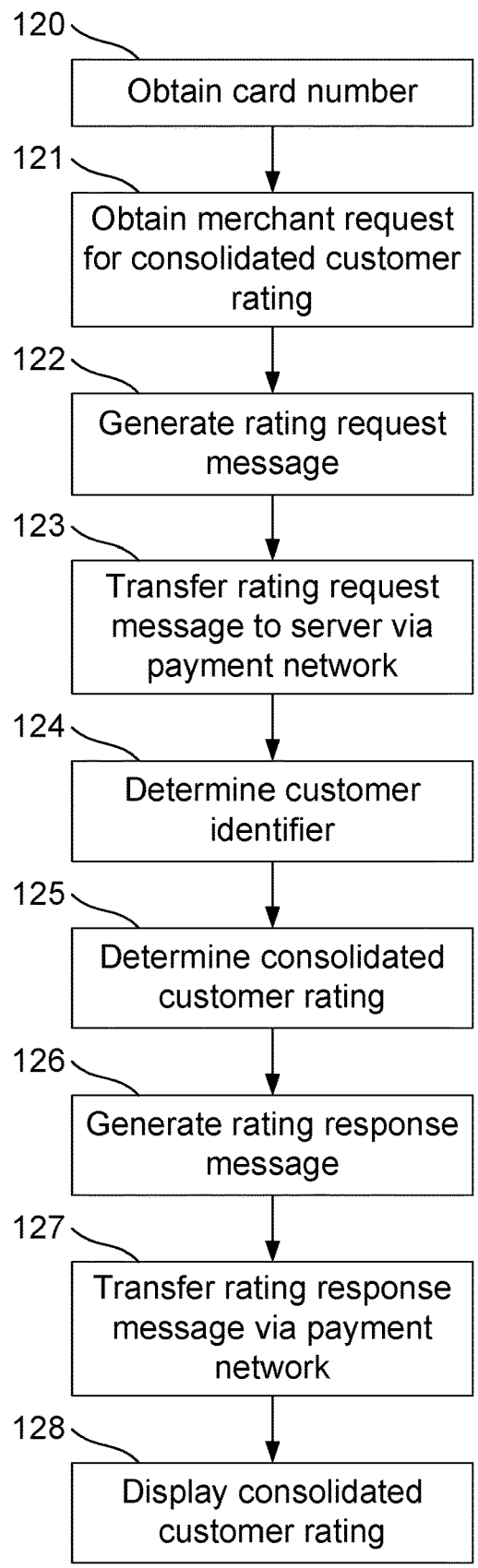
FIG. 1B is a flow chart of an example of a method for allowing a merchant to access a consolidated rating for a customer.

In another aspect, the method illustrated in FIG. 1B may be described from the perspective of the server, such that the method includes the following specific steps performed by the server. The server will receive, from a merchant device via a payment network, a rating request message as per step 123. It will be recalled that the rating request message is generated by the merchant device as per step 122, in response to a merchant request for a consolidated customer rating for the customer at step 121, and that the rating request message includes a card number for a payment card of the customer. In response to receipt of the rating request message, the server will determine a customer identifier based on the card number as per step 124. Following this, the server will cause a consolidated customer rating to be determined based on customer ratings stored in the ratings database in association with the customer identifier, as per step 125. Then, the server will generate a rating response message including the consolidated customer rating as per step 126, and subsequently transfer the rating response message to the merchant device via the payment network as per step 127, to thereby allow the consolidated customer rating to be displayed using the merchant device as indicated in step 128.

A number of further features of the method of FIG. 1B from the perspective of the server will now be described.

As discussed above, in some examples, the step of determining the customer identifier may include extracting a primary account number (PAN) from the card number, and in some implementations, determining the customer identifier may include retrieving, from an issuer database, a customer identifier associated with the card number.

With regard to the above discussed step of causing the consolidated customer rating to be determined, this may involve the server performing the steps of generating a rating query message including the customer identifier and transferring the rating query message to a ratings server including the ratings database, to thereby cause the ratings server to query the ratings database based on the customer identifier. As discussed above, the server may be an issuer server operated by an issuer associated with the payment card of the customer, whilst the ratings server may be operated by the payment network service provider.

In some examples, the server may generate the rating query message so that the rating query message includes additional query details such as a merchant identifier, an issuer identifier and/or a transaction date range, such that the server may cause the ratings server to query the ratings database based on the customer identifier and at least some of the additional query details. It will be appreciated that this can enable more complex queries of the ratings database to be performed. For example, the rating query message may be generated so that the ratings database may be queried so that only customer ratings for the customer for the particular merchant or from within a particular date range is returned. In some implementations, the merchant request for the consolidated customer rating at step 121 may include merchant selected options for constraining the scope of the query used to determine the consolidated customer rating.

In view of the above, it will be appreciated that a server for allowing a merchant to access a consolidated customer rating for a customer as discussed above may be configured to: receive, from a merchant device via a payment network, a rating request message generated by the merchant device in response to a merchant request for a consolidated customer rating for the customer, the rating request message including a card number for a payment card of the customer; determine a customer identifier based on the card number; cause a consolidated customer rating to be determined based on customer ratings stored in a ratings database in association with the customer identifier; generate a rating response message including the consolidated customer rating; and transfer the rating response message to the merchant device via the payment network, to thereby allow the consolidated customer rating to be displayed using the merchant device.

In another aspect, the method illustrated in FIG. 1B may also be described from the perspective of the ratings server including the ratings database. In this case, the method includes the following specific steps performed by the ratings server, which relate to step 125 of FIG. 1B. The ratings server may receive, from the issuer server, a rating query message generated by the issuer server in response to receipt of a rating request message transferred from a merchant device via a payment network. The rating query message may include a customer identifier determined based on a card number for a payment card of the customer. The ratings server will be configured to respond to receipt of the rating query message by querying the ratings database to determine customer ratings stored in association with the customer identifier. The ratings server will subsequently determine a consolidated customer rating based on the customer ratings, and then transfer the consolidated customer rating to the issuer server, to thereby allow the consolidated customer rating to be returned to the merchant device via the payment network and to allow the consolidated customer rating to be displayed using the merchant device.

In some implementations, the step of querying the ratings database may return a plurality of customer ratings associated with the customer identifier, such that the step of determining the consolidated customer rating may include calculating an average customer rating based on the plurality of customer ratings. Although the averaged customer rating may be sufficient for providing the consolidated customer rating for many merchants, the method may be enhanced to enable consolidated customer ratings to be determined based on more complex techniques. For instance, as mentioned above, the rating query message may include additional query details such as a merchant identifier, a merchant category code, an issuer identifier and/or a transaction date range, such that the ratings server can query the ratings database based on the customer identifier and at least some of the additional query details. It should be appreciated that merchant category code can relate to an industry that the merchant trades under, for example, retail, travel, utilities, dining, and so forth.

In view of the above, it will be appreciated that a ratings server for allowing a merchant to access a consolidated customer rating for a customer as discussed above may include the ratings database and be configured to: receive, from an issuer server, a rating query message generated by the issuer server in response to receipt of a rating request message transferred from a merchant device via a payment network, the rating query message including a customer identifier determined based on a card number for a payment card of the customer; query the ratings database to determine customer ratings stored in association with the customer identifier; determine a consolidated customer rating based on the customer ratings; and transfer the consolidated customer rating to the issuer server to thereby allow the consolidated customer rating to be returned to the merchant device via the payment network and to allow the consolidated customer rating to be displayed using the merchant device. The ratings server may use additional filters when determining the consolidated customer ratings, such filters may be based on (without limitation): legal and regulatory requirements, information privacy requirements, the jurisdictions of the merchant and/or the issuer, and opt-in/opt-out decisions by the consumer.

Further implementation details of the above discussed techniques will now be described.

Figure 2:
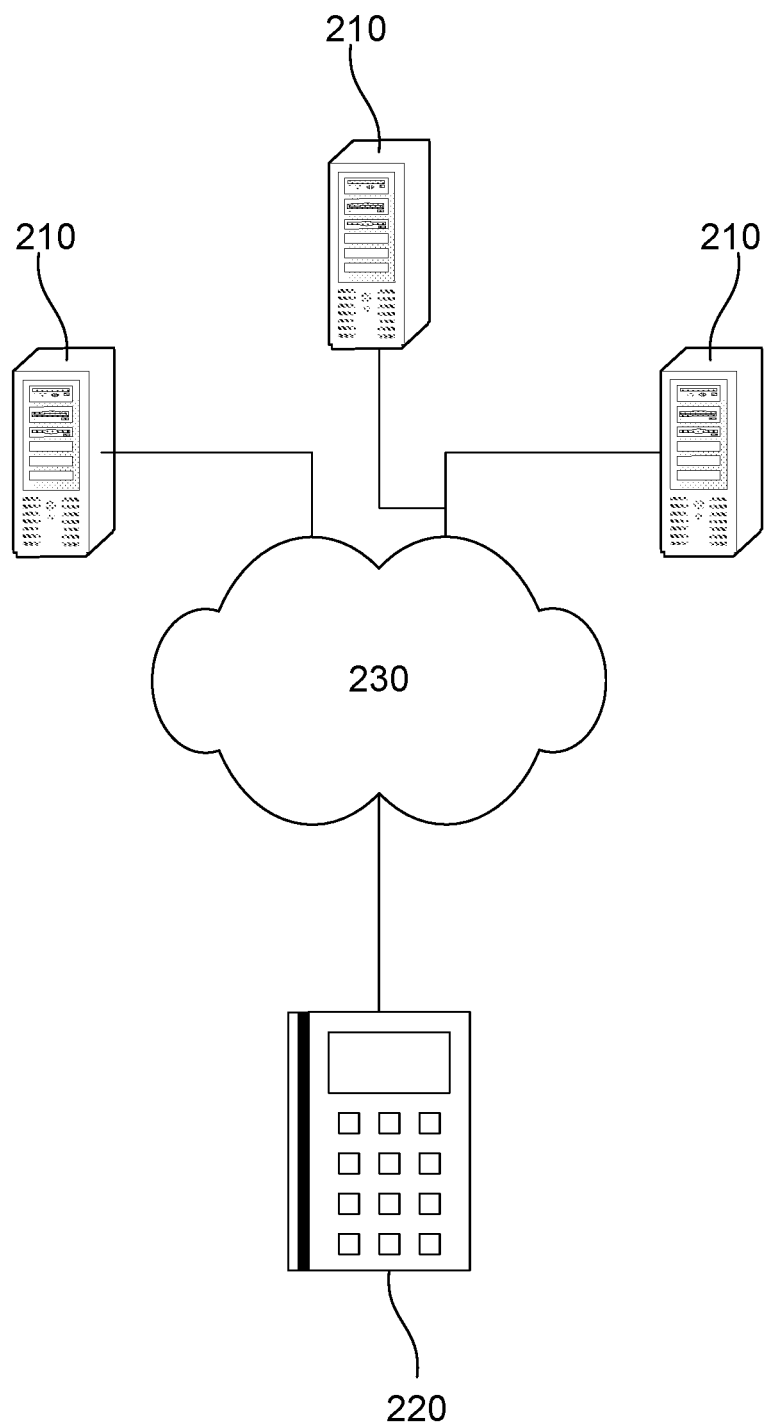
FIG. 2 is a schematic diagram of an example of a distributed computer architecture.

In some examples, the methods of FIGS. 1A and 1B may be performed by one or more processing systems operating as part of a distributed architecture, an example of which will now be described with reference to FIG. 2.

In this example, a number of processing systems 210 are provided coupled to one or more merchant devices 220, via one or more communications networks 230, such as the Internet, and/or a number of local area networks (LANs). The processing devices are typically operated by parties, such as acquirers, service providers and issuers, and it will therefore be appreciated that any number of processing systems and any number of merchant devices 220 could be provided, and the current representation is for the purpose of illustration only. The configuration of the networks 230 is also for the purpose of example only, and in practice the processing systems 210 and merchant devices 220 can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth, or the like.

In use, the processing systems 210 and the merchant devices 220 are adapted to perform various data processing tasks, including those required for performing the methods as described above along with those required to provide their respective roles as part of a conventional card transaction process, and the particular functionality will vary depending on the particular requirements. For example, the merchant devices 220 can be adapted to perform tasks including obtaining a card number, a customer rating input by the merchant or merchant request for a consolidated customer rating, generating transaction messages or rating request messages as required and transferring these via the payment network, receiving a rating response message and displaying a consolidated customer rating as discussed above. The processing systems can be adapted to perform tasks described above with regard to the issuer server and the ratings server, for example.

Whilst the processing systems 210 are shown as single entities, it will be appreciated they could include a number of processing systems distributed over a number of geographically separate locations, for example as part of a cloud based environment. Thus, the above described arrangements are not essential and other suitable configurations could be used.

Figure 3:
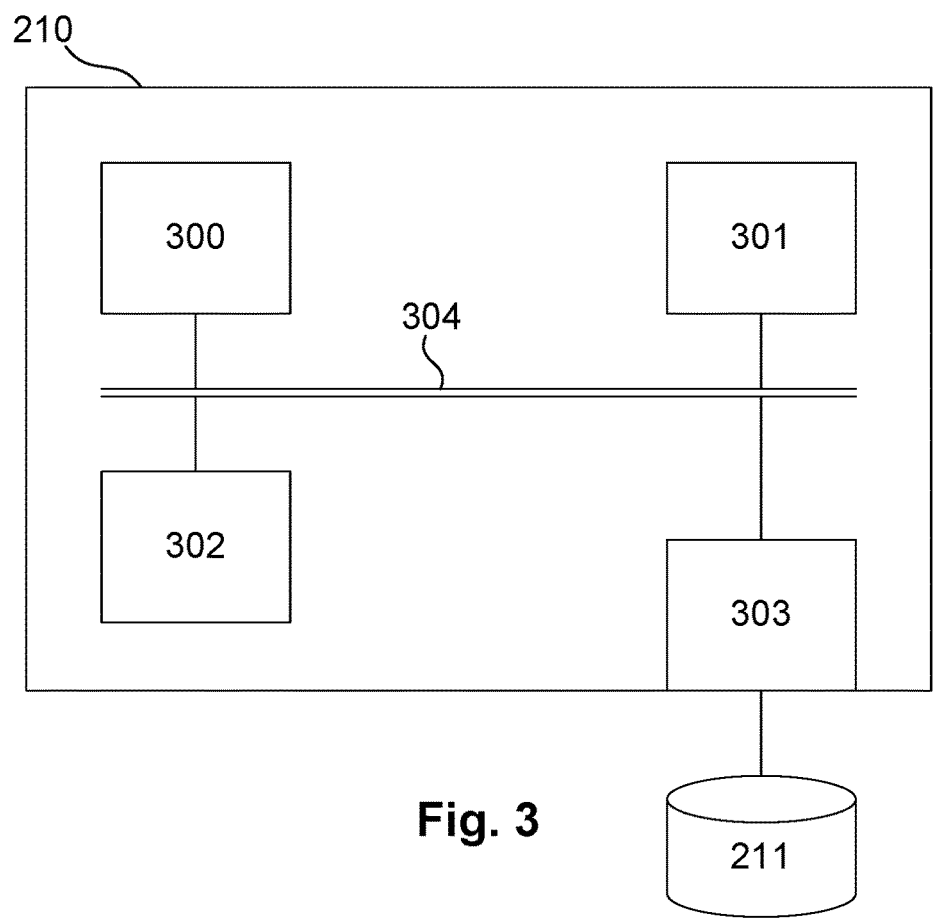
FIG. 3 is a schematic diagram of an example of a processing system of FIG. 2.

An example of a suitable processing system 210 is shown in FIG. 3. In this example, the processing system 210 includes at least one microprocessor 300, a memory 301, an optional input/output device 302, such as a keyboard and/or display, and an external interface 303, interconnected via a bus 304 as shown. In this example the external interface 303 can be utilised for connecting the processing system 210 to peripheral devices, such as the communications networks 230, databases 211 (such as the above mentioned issuer database and ratings database), other storage devices, or the like. Although a single external interface 303 is shown, this is for the purpose of example only, and in practice multiple interfaces using various methods (e.g. Ethernet, serial, USB, wireless or the like) may be provided.

In use, the microprocessor 300 executes instructions in the form of applications software stored in the memory 301 to allow the required processes to be performed. The applications software may include one or more software modules, and may be executed in a suitable execution environment, such as an operating system environment, or the like.

Accordingly, it will be appreciated that the processing system 210 may be formed from any suitable processing system, such as a suitably programmed PC, web server, network server, or the like. In one particular example, the processing system 210 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

Figure 4:
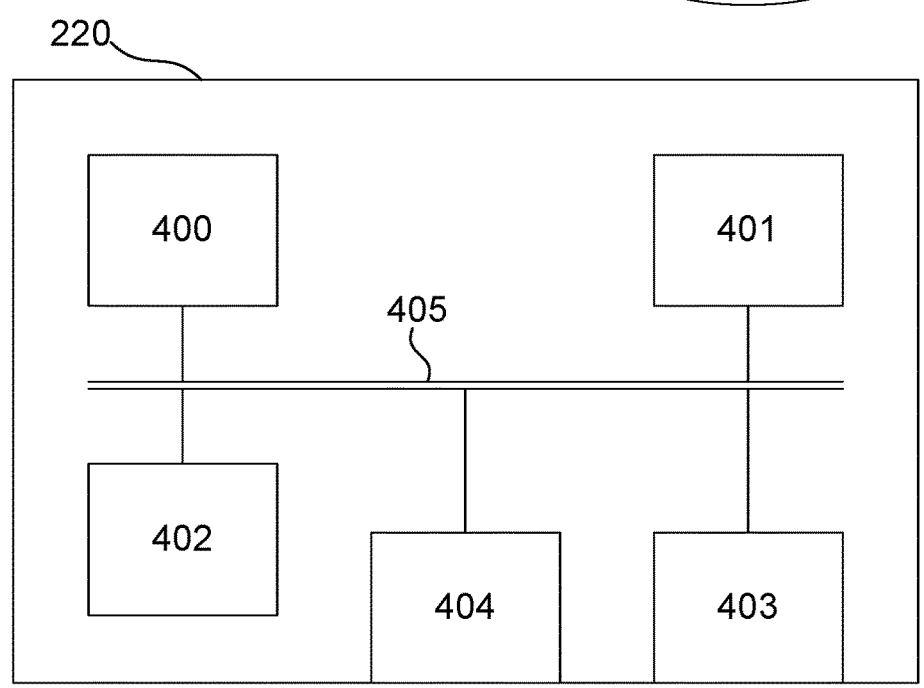
FIG. 4 is a schematic diagram of an example of a merchant device of FIG. 2.

As shown in FIG. 4, in one example, the merchant device 220 includes at least one microprocessor 400, a memory 401, an input/output device 402, such as a keyboard and/or display, an external interface 403, and typically a card reader 404, interconnected via a bus 405 as shown. In this example the external interface 403 can be utilised for connecting the merchant device 220 to peripheral devices, such as the communications networks 230 databases, other storage devices, or the like. Although a single external interface 403 is shown, this is for the purpose of example only, and in practice multiple interfaces using various methods (e.g. Ethernet, serial, USB, wireless or the like) may be provided. The card reader 404 can be of any suitable form and could include a magnetic card reader, or contactless reader for reading smartcards, or the like.

In use, the microprocessor 400 executes instructions in the form of applications software stored in the memory 401, and to allow communication with one of the processing systems 210.

Accordingly, it will be appreciated that the merchant devices 220 may be formed from any suitable processing system, such as a suitably programmed PC, Internet terminal, lap-top, or hand-held PC, and in one preferred example is either a POS terminal, or a tablet, or smart phone, with integrated or connected card reading capabilities. However, it will also be understood that the merchant devices 220 can be any electronic processing device such as a microprocessor, microchip processor, logic gate configuration, firmware optionally associated with implementing logic such as an FPGA (Field Programmable Gate Array), or any other electronic device, system or arrangement.

Examples of the specific processes for performing the above discussed customer rating functionalities will now be described in further detail. For the purpose of these examples it is assumed that one or more respective processing systems 210 are servers that provide functionality required of the acquirer, the issuer and the service provider, and will be referred to respectively as acquirer, issuer and provider servers. The servers 210 typically execute processing device software, allowing relevant actions to be performed, with actions performed by the server 210 being performed by the processor 300 in accordance with instructions stored as applications software in the memory 301 and/or input commands received from a user via the I/O device 302. It will also be assumed that actions performed by the merchant device 220, are performed by the processor 400 in accordance with instructions stored as applications software in the memory 401 and/or input commands received from a user via the I/O device 402.

However, it will be appreciated that the above described configuration assumed for the purpose of the following examples is not essential, and numerous other configurations may be used. It will also be appreciated that the partitioning of functionality between the different processing systems 210 may vary, depending on the particular implementation.

Figure 5:
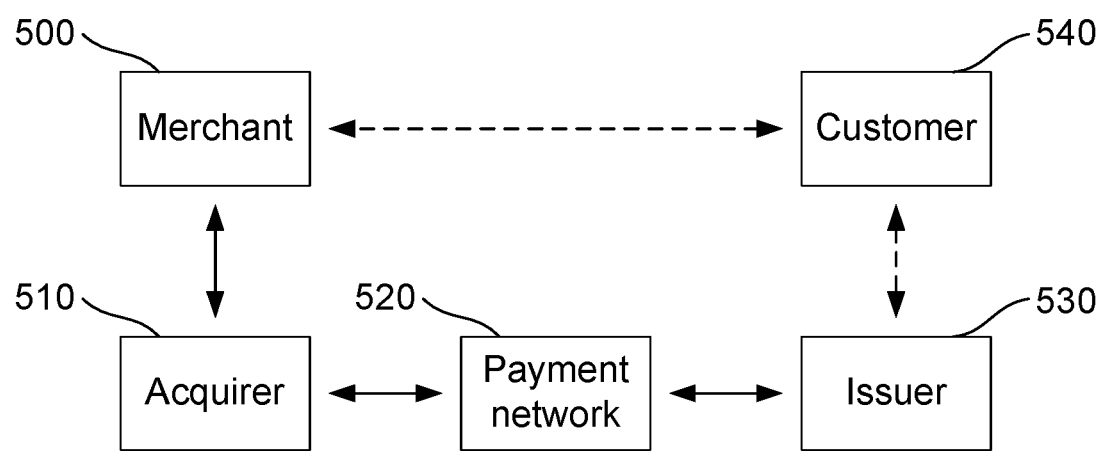
FIG. 5 is a schematic diagram of an example of the interactions involved in a traditional approach to processing a card transaction.

As mentioned, the techniques described herein may be performed as an extension of conventional card transaction processes, and accordingly, to provide context for these techniques, an example conventional card transaction process will now be described with reference to FIGS. 5 and 6.

In this example, the parties involved include a merchant 500, an acquirer 510, a service provider in the form of a payment network 520, an issuer 530 and a customer 540. The acquirer 510 is a bank that processes and settles a merchant's credit card transactions with the help of a card issuer 530, which is a financial institution, bank, credit union or company that issues or helps issue cards to cardholders, such as customers. The payment network 520 is typically a card network, such as Visa, MasterCard or other similar network that act as an intermediary between the acquirer and the issuer to authorize credit card transactions.

It will be appreciated that the merchant will utilise a merchant terminal 220, whilst the acquirer 510, the service provider's payment network 520 and the issuer 530, will each have a number of typically networked processing systems, in the form of respective servers 210. The servers 210 operated by utilised by the acquirer 510 and the issuer 530 may also be referred to as an acquirer switch and the issuer switch, respectively. For the purpose of the following explanation, it will be assumed that actions performed by each of the parties are performed at least in part by the relevant terminal or server.

An example transaction process typically commences with the merchant 510 and customer 540 agreeing on a transaction, typically in response to a customer purchase of goods or services, with the merchant 510 entering details into the merchant terminal 220, before reading the customer's credit card. At this point, an authorisation process is performed at step 600, with a transaction message in the form of an authorisation request being transferred from the merchant terminal 220, via the acquirer 510 and payment network 520 to the issuer 530. Assuming the transaction meets relevant criteria, the issuer returns an authorisation code to the merchant terminal, via the payment network 520 and acquirer 510, allowing the transaction to proceed.

Once approved, the transaction is performed, with details of the completed transaction being added to a payment batch, which in general is processed on a daily basis at step 610. The batch is forwarded to the acquirer 510, which then generates payment files at step 620, for each of the respective card issuers. The payment files are transferred to the respective issuer 530, via the payment network 520, allowing issuer to pay the acquirer at step 640.

Once the payment has cleared at step 650, the acquirer pays the merchant at step 660 by crediting the merchant account the transaction amount less the merchant services fee.

Figure 6:
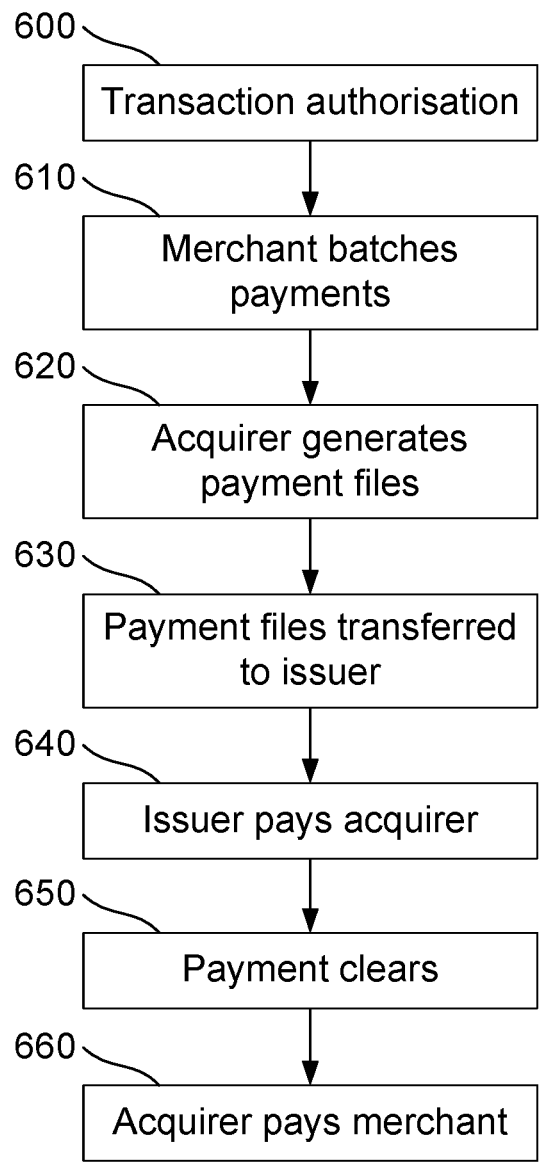
FIG. 6 is a flowchart of an example of an example of a traditional approach to processing a card transaction.

It is noted that the method described above with regard to FIG. 1 takes place within the authorisation process of step 600 in FIG. 6. The subsequent payment processing steps of FIG. 6 will proceed in a generally conventional matter, with the exception of the discounted amount being debited from the customer account by the issuer rather than the original transaction amount.

An example implementation of the customer rating functionality as part of the credit/debit card payment process will now be described with reference to FIGS. 7, 8A and 8B.

Figure 7:
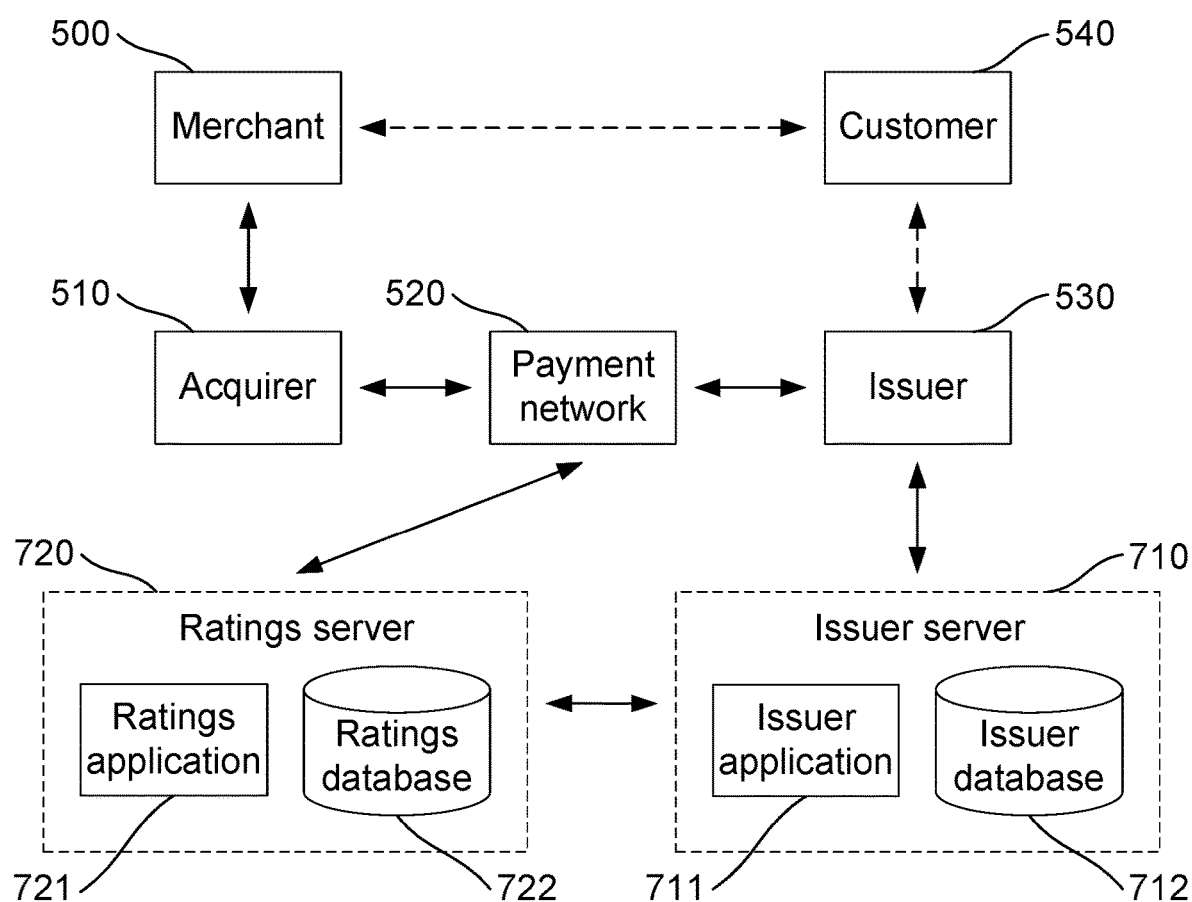
FIG. 7 is a schematic diagram of an example of the interactions involved in an example of a method for allowing a merchant to rate a customer as part of a card transaction.

FIG. 7 shows the parties involved in the card transaction, which will also be involved in allowing the merchant to rate the customer as part of the card transaction. The involved parties once again include a merchant 500, an acquirer 510 operating an acquirer switch, a service provider in the form of a payment network 520, an issuer 530 operating an issuer switch, and a customer 540. In this example, the issuer 530 also operates an issuer server 710, which may include an issuer application 711 for facilitating back end functionalities of the issuer and an issuer database 712 for storing information regarding issued cards, such as associated customer identification numbers and card numbers. In this case, the payment network 520 also operates a ratings server 720, which may include an issuer application 721 for facilitating the storage and distribution of customer ratings, along with a ratings database for storing the customer ratings. The issuer server 710 may communicate with the ratings server 720 to send a new customer rating for storage in the ratings database 722 or to request a consolidated customer rating. The consolidated customer rating can be an average rating of the customer ratings associated with a customer identifier or a subset of the customer ratings associated with a customer identifier, such as, for example, customer ratings within a predetermined time frame. In some examples this communication may occur directly between the issuer server 710 the ratings server 720 but in alternative examples the communication may occur via the issuer 530 and payment network 520.

Figure 8:
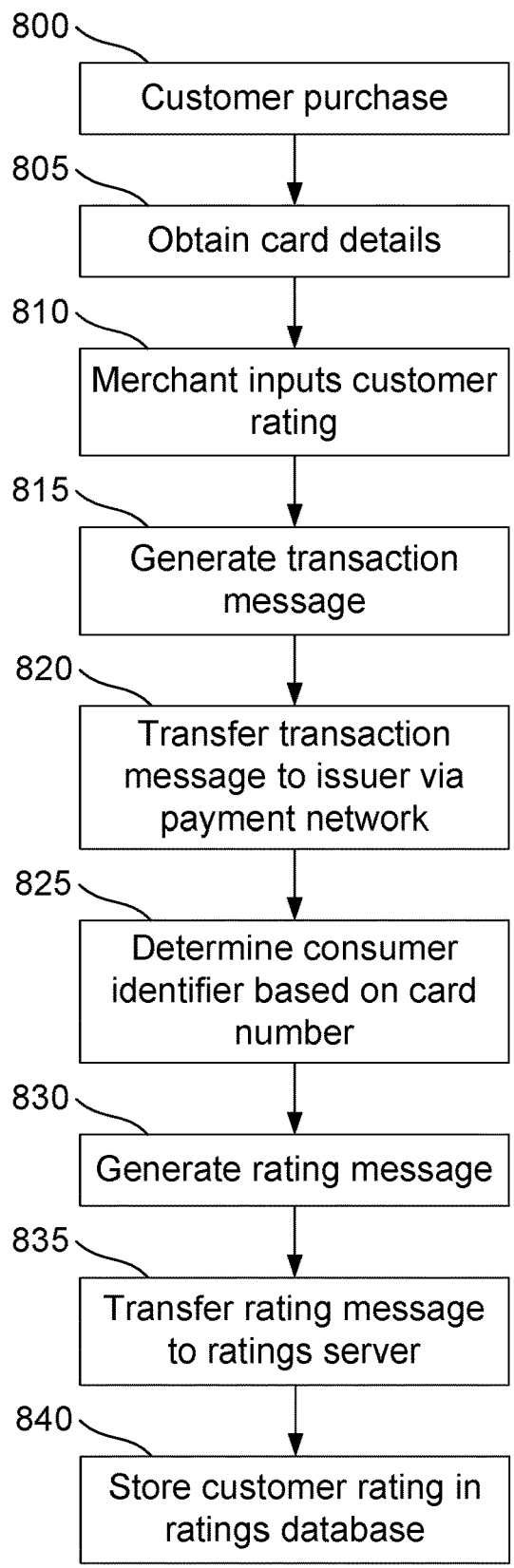
FIG. 8 is a schematic diagram of an example of a method of a merchant rating a customer as part of a card transaction; and, FIGS. 9A and 9B is a schematic diagram of an example of a method of a merchant accessing a consolidated customer rating.

An example of a transaction process including adaptations to allow a customer rating provided by the merchant to be stored will now be described with reference to FIG. 8.

At step 800, the transaction process is initiated when a customer makes a purchase of goods and/or services from a merchant for an agreed transaction amount. For example, the purchase may be made at a place of business of the merchant at a POS terminal or on the merchant's website via a suitably configured e-commerce platform. In this case it will be assumed that a POS terminal is used.

The customer will then opt to pay by credit/debit card and card details will be obtained at step 805. For instance, the customer's credit/debit card may be swiped at the merchant's POS terminal. The card details will include at least the card number which will typically be made up of a bank identification number (BIN) which identifies the issuer of the card and a primary account number (PAN) which is unique to the customer. The card details may further include an expiry date, a card verification value/code (CVV/CVC) or a personal identification number (PIN). The card details obtained may depend on the particular security measures that may be in place for card payments with the merchant, and may also vary depending on the transaction amount.

At step 810, the merchant will be given the opportunity to input a customer rating as part of the card transaction. For example, the POS terminal may display a prompt for the merchant to enter a rating, or the merchant may be able to press a particular button (such as the "#" button) to initiate the input of a rating without a displayed prompt. Then, the merchant can press a number indicative of the merchant's rating of the customer. In one implementation the rating may be a number in the range of 1 to 5, where the number 1 corresponds to the lowest possible rating and the number 5 corresponds to the highest possible rating.

A transaction message will then be generated at step 815. The transaction message will be generated including the card details and details of the payment including the transaction amount as per transaction messages typically generated in conventional transaction processes, but will additionally include an indication of the customer rating input by the merchant.

The transaction message may be generated in the form of an authorization message, typically in ISO8583 format, such as an "MTI 0100" authorization request message, which is generated in the merchant's POS terminal and passed on to the acquirer. It will be appreciated that the usage of a standardised message format will involve providing information in particular data element fields, to allow different system to interpret the transaction message correctly. For instance, the transaction amount may be provided in the data element field DE 4. In a similar manner, the customer rating may be provided in a particular data element field to allow this to be readily identified when the transaction message is subsequently processed by other parties.

Following generation of the transaction message, this will be transferred from the POS terminal to the issuer via the payment network at step 820. This will usually involve the POS terminal transferring the transaction message to the merchant's acquirer switch, which will in turn transfer the transaction message to the payment network. Then, the payment network may identify the issuer associated with the customer's card, for instance based on the bank identification number (BIN) provided as part of the payment card number, and subsequently transfer the transaction message to the issuer switch associated with the identified issuer. The transfer of the transaction message may generally follow a conventional transaction process, and the transaction message will be used to allow the transaction to be performed in a conventional manner.

However, alongside the conventional transaction process, the transaction message will also be received by the issuer server operated by the issuer to allow further processing of the customer rating included in the transaction message. At step 825 the issuer server will determine the customer identifier based on the card number provided in the transaction message. This may involve an issuer application extracting the customer's PAN from the card number and performing a query of an issuer database including customer details associated with cards issued by the issuer. At this stage, the issuer server may also retrieve other customer details associated with the customer, such as the customer's email address or mobile number.

Then, at step 830, the issuer server may generate a rating message including at least the customer identifier determined in the previous step along with the customer rating from the transaction message. In some implementations, additional information may be provided in the rating message to allow tracking of other details associated with the customer rating. For example, the rating message may additionally include an issuer identifier for the issuer, a merchant identifier for the merchant and an indication of the transaction date. The rating message may also include at least some customer details if these are retrieved at step 825.

The rating message will then be transferred to the ratings server at step 835. This may involve a direct transfer facilitated by communications between the issuer server and the ratings server, or alternatively, this may involve communications via the issuer switch and payment network.

Upon receipt of the rating message, at step 840 the ratings server will store the customer rating in the ratings database, as a function of the ratings application executed in the ratings server. Typically the ratings database will be implemented in the form of a relational database, and the customer rating will be associated with at least the customer identifier, but may also be associated with other additional information provided in the rating message such as the issuer identifier, the merchant identifier, the transaction date and potentially other customer details, which will be stored in corresponding fields of the ratings database. It will be appreciated that associating the customer rating with additional information can enable more sophisticated queries of the ratings database to be performed, as will be exemplified in the following example.

As discussed above, the stored customer ratings may be used to provide a consolidated customer rating to a merchant, which the merchant may use to take proactive actions when the merchant is about to do business with a customer. Such a consolidated customer rating can also be provided to the merchant based on a process similar to that described above for storing the customer rating.

Figure 9A:
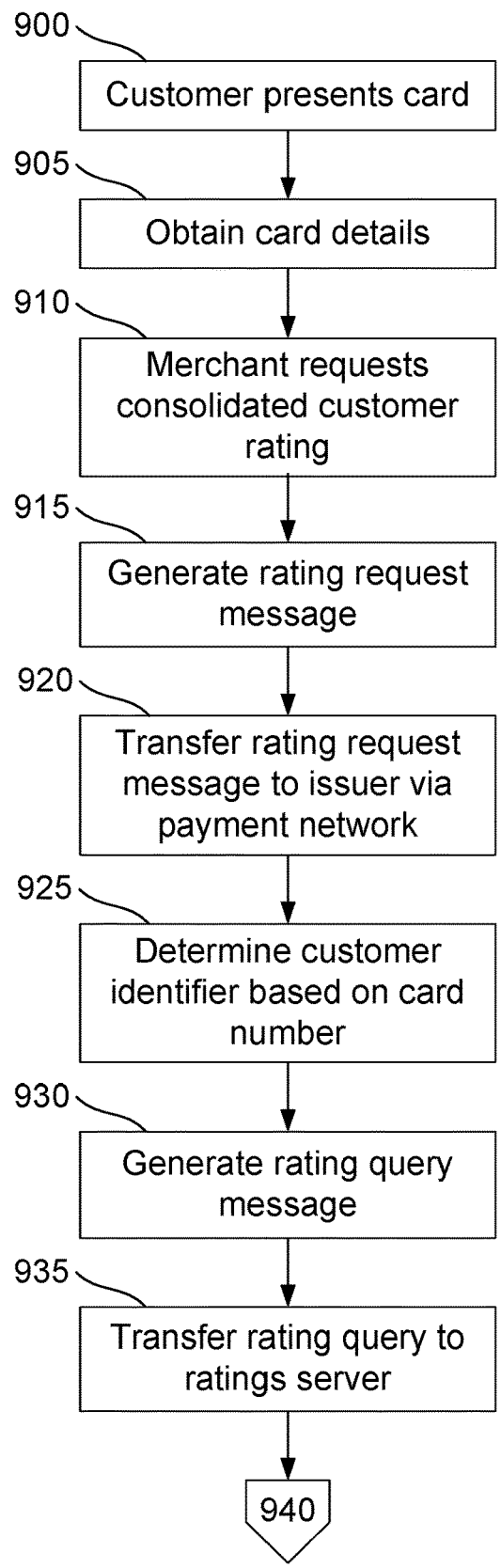
Figure 9B:
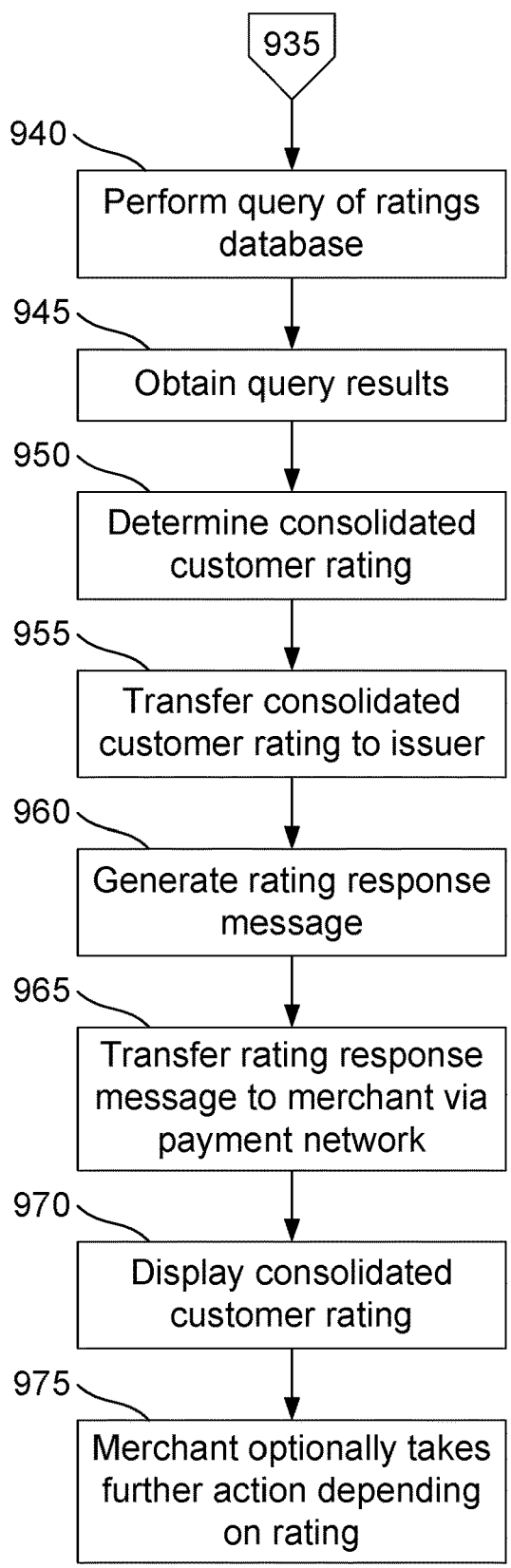

Accordingly, an example of a merchant retrieving a consolidated customer rating for a customer will now be described with reference to FIGS. 9A and 9B.

This example commences at step 900 with the customer presenting a credit/debit card to a merchant, such as at the beginning of a payment transaction to complete a purchase or at any other stage in doing business with the merchant. For example, the customer's card may be presented to the merchant upon checking in to a hotel or the like to allow pre-authorisation or for reserving/booking goods or services before these are actually provided and paid for. In some examples, the merchant may request the customer's card for the express purpose of retrieving a customer rating.

In any event, the card details will be obtained at step 905, such as by swiping the customer's credit/debit card at the merchant's POS terminal. The card details will include at least the card number which will typically be made up of a bank identification number (BIN) which identifies the issuer of the card and a primary account number (PAN) which is unique to the customer. The card details may further include an expiry date, a card verification value/code (CVV/CVC) or a personal identification number (PIN). The card details obtained may depend on the particular security measures that may be in place for card payments with the merchant, and may also vary depending on the transaction amount.

At step 910, the merchant will request a consolidated customer rating for the customer. This may involve the merchant interacting with a user interface of the POS terminal to select an available option for requesting the consolidated customer rating. In some implementations, the option may not be made visible to the customer and the merchant may initiate the request by pressing a particular button on the POS terminal. This may allow the merchant to request the consolidated customer rating without the customer's knowledge, if desired by the merchant.

A rating request message will then be generated at step 915. The rating request message will typically be generated by the POS terminal based on the card details. Although the rating request message will not be used to perform a payment transaction, it may be generated using a standard message format similar to that used for an authorization message as described in the previous example. This can help to allow the rating request message to be handled by the acquirer, the payment network and the issuer in a manner that is consistent with standard transaction processing techniques, such that minimal configuration changes may be needed to enable the functionality for allowing a rating request message to be processed.

The rating request message will then be transferred from the POS terminal to the issuer via the payment network at step 920. This will usually involve the POS terminal transferring the rating request message to the merchant's acquirer switch, which will in turn transfer the rating request message to the payment network. Then, the payment network may identify the issuer associated with the customer's card, for instance based on the bank identification number (BIN) provided as part of the payment card number, and subsequently transfer the rating request message to the issuer switch associated with the identified issuer. Although the rating request message is not the same as the transaction message in the previous example, the transfer of the rating request message may follow a similar process as previously discussed for the transfer of the transaction message.

The rating request message will be received by the issuer server operated by the issuer to allow further processing of the rating request. At step 925 the issuer server will determine the customer identifier based on the card number provided in the rating request message. This may involve the issuer application extracting the customer's PAN from the card number and performing a query of the issuer database including customer details associated with cards issued by the issuer.

Then, at step 930, the issuer server may generate a rating query message based on the customer identifier determined in the previous step. In some implementations, additional information may be provided in the rating query message, such as an issuer identifier for the issuer, a merchant identifier, or a merchant category code for the merchant. This additional information may subsequently be used to allow a consolidated customer rating to be generated in different forms.

The rating query message will then be transferred to the ratings server at step 935. As per the rating message in the previous example, this may involve a direct transfer facilitated by communications between the issuer server and the ratings server, or alternatively, this may involve communications via the issuer switch and payment network.

Upon receipt of the rating query, at step 940 the ratings server will perform a query of the ratings database based on the rating query message. This will be carried out as a function of the ratings application executed in the ratings server, which will interpret the information provided in the rating query message and generate a suitable database query for querying the database to obtain ratings associated with the customer identifier provided in the rating query message. In some implementations the query may be limited by: (i) additional information that may be included in the rating query message, (ii) legal and regulatory requirements, (iii) information privacy requirements, (iv) the jurisdictions of the merchant and/or the issuer, or (v) opt-in/opt-out decisions by the consumer.

At step 945, the results of the query will be obtained by the ratings application and a consolidated customer rating may be subsequently determined at step 950. It will be appreciated that the consolidated customer rating may be determined in different ways depending on requirements. In some implementations, the consolidated customer rating may be determined by calculating an average of all customer ratings associated with the customer identifiers. However, in other implementations, only a subset of the customer ratings may be used to determine the consolidated customer rating, such as only customer ratings within a predetermined time frame before the date of the query.

In any event, at step 955 the consolidated customer rating will be returned to the issuer and at step 960 a rating response message will subsequently be generated by the issuer, typically by the issuer application. The rating response message will usually include the consolidated customer rating together with the customer identification. Other information may also be included in the rating response message as required to ensure that it can be properly returned to the merchant that initiated the rating request. For example, the in some implementations the rating response message may include a merchant identifier and an acquirer identifier associated with the original rating request message. The rating response message may also be generated based on a standard message format as was the case for the rating request message.

The rating response message is then transferred to the merchant via the payment network as shown in step 965. This will generally follow a reversed path compared to the transfer of the rating request message as described above for step 920. In particular, the rating response message may be transferred from the issuer server to the issuer switch, and then to the payment network where it will be routed to the appropriate acquirer switch associated with the merchant, which will in turn transfer the rating response message to the merchant's POS terminal.

Once the rating response message has been received at the merchant end, the consolidated customer rating may be determined from the rating response message and displayed to the merchant at step 970. The consolidated customer rating may be displayed on a display of the POS terminal or on another display coupled to the POS terminal depending on the implementation. For instance, in some circumstances it may be undesirable to display the consolidated customer rating in a manner that can be viewed by the customer.

It will be appreciated that the above described functionalities for allowing merchants to rate customers as part of card transactions with the customer and for allowing merchants to access consolidated customer ratings using similar techniques provide a convenient platform for consolidation of a customer rating for their behavioural and transactional aspects across merchants, vendors and businesses. The consolidated rating may be shared across merchants, vendors and businesses to allow informed decisions to be made on whether to do business with a customer, or the particular parameters of any business transactions with the customer, based on the customer rating.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A method for processing a consolidated customer rating for a customer, the method being performed by a server, the method comprising:
   receiving a message from a merchant device via a payment network, the message comprising:
      a card number for a payment card of the customer,
      a merchant request for a consolidated customer rating for the customer, the merchant request comprising merchant-selected options comprising at least one of: a selected date range and a specified merchant with whom the customer has engaged in prior transactions, and
      a rating request message including the card number;
   determining the consolidated customer rating based on ratings for the customer received from a plurality of merchants indicating performance of the customer in prior transactions during the selected date range with the plurality of merchants or with the specified merchant based on the merchant-selected options within the merchant request;
   determining a customer identifier based on the card number;
   determining a consolidated customer rating for the customer based on customer ratings for the customer received from a plurality of merchants indicating satisfactory performance of the customer in prior transactions with the plurality of merchants, the customer rating being stored in a ratings database in association with the customer identifier;
   generating a rating response message including the consolidated customer rating; and
   transmitting the rating response message to the merchant device via the payment network to enable display of the consolidated customer rating and, based on the consolidated customer rating, to enable a merchant accessing the merchant device to process a transaction associated with the payment card, modify the transaction, or cancel the transaction.

2. A method according to claim 1, wherein obtaining the merchant request includes receiving a request command input by the merchant to indicate that the merchant wishes to access the consolidated customer rating for the customer.

3. A method according to claim 1, wherein the method includes transferring the rating request message to an acquirer server associated with the merchant device, the acquirer server transferring the rating request message to the payment network and the payment network subsequently transferring the rating request message to an issuer server associated with the payment card of the customer, to thereby allow the issuer server to determine the customer identifier, cause the consolidated customer rating to be determined and return the consolidated customer rating to the merchant device.

4. A method according to claim 1, wherein the method includes, after displaying the consolidated customer rating, displaying a prompt for the merchant to take further action depending on the consolidated customer rating, and includes obtaining the card number for use in a card transaction, the prompt including options for selection by the merchant, the options including at least one of:
   a) process the card transaction;
   b) modify the card transaction; and
   c) cancel the card transaction.

5. A method for allowing a merchant to access a consolidated customer rating for a customer, the method being performed in a server, the method including:
   receiving, from a merchant device via a payment network, a rating request message generated by the merchant device in response to a merchant request for a consolidated customer rating for the customer, the rating request message including a card number for a payment card of the customer, the rating request comprising merchant-selected options comprising at least one of: a selected date range and a specified merchant with whom the customer has engaged in prior transactions;
   determining a customer identifier based on the card number;
   determining a consolidated customer rating for the customer based on customer ratings stored in a ratings database in association with the customer identifier, wherein the consolidated customer rating is based on ratings for the customer received from a plurality of merchants indicating performance of the customer in prior transactions during the selected date range with the plurality of merchants or with the specified merchant based on the merchant-selected options within the merchant request;
   generate a rating response message including the consolidated customer rating; and
   transferring the rating response message to the merchant device via the payment network, to thereby allow the consolidated customer rating to be displayed using the merchant device and based on the consolidated customer rating, to enable a merchant accessing the merchant device to process a transaction associated with the payment card, modify the transaction, or cancel the transaction.

6. A method according to claim 5, wherein determining the customer identifier includes extracting a primary account number (PAN) from the card number.

7. A method according to claim 5, wherein determining the customer identifier includes retrieving, from an issuer database, a customer identifier associated with the card number.

8. A method according to claim 5, wherein the method includes causing the consolidated customer rating to be determined by:
   a) generating a rating query message including the customer identifier; and b) transferring the rating query message to a ratings server including the ratings database, to thereby cause the ratings server to query the ratings database based on the customer identifier.

9. A method according to claim 5, wherein the method includes:
   a) generating the rating query message so that the rating query message includes additional query details including at least one of:
      i) a merchant identifier;
      ii) an issuer identifier; and
      iii) a transaction date range; and
   b) causing the ratings server to query the ratings database based on the customer identifier and at least some of the additional query details.

10. A method according to claim 5, wherein the server is an issuer server operated by an issuer associated with the payment card of the customer.

* * * * *